Dec. 24, 1963 A. REICH 3,115,625

CODER AND DECODER FOR RADAR TYPE SIGNALS

Filed July 27, 1959 3 Sheets-Sheet 1

INVENTOR.
ALFRED REICH
BY Wade Koontz
ATTORNEY
and Richard J. Killoren
AGENT

CODER AND DECODER FOR RADAR TYPE SIGNALS

Filed July 27, 1959 3 Sheets-Sheet 2

INVENTOR.
ALFRED REICH
BY Wade Koontz
ATTORNEY
Richard J. Killoren
AGENT

INVENTOR.
ALFRED REICH
BY
ATTORNEY
AGENT 3,115,625

CODER AND DECODER FOR RADAR TYPE SIGNALS

Alfred Reich, Barrington, N.J., assignor to the United States of America as represented by the Secretary of the Air Force Filed July 27, 1959, Ser. No. 829,924
5 Claims. (Cl. 343—5)

This invention relates to a coding and decoding circuit for radar systems which must identify their own signals or the signals of other radars such as in shoran systems or IFF systems.

One object of the invention is to provide a coding and decoding system for identification radar which makes use of part of the equipment in both the coding and decoding operations thus requiring fewer components than prior art devices.

Another object is to provide a coding and decoding system for identification radar wherein the coding operation automatically sets the decoding operation.

These and other objects will be more clearly understood from the following detailed description taken with the drawing wherein.

Figure 1:
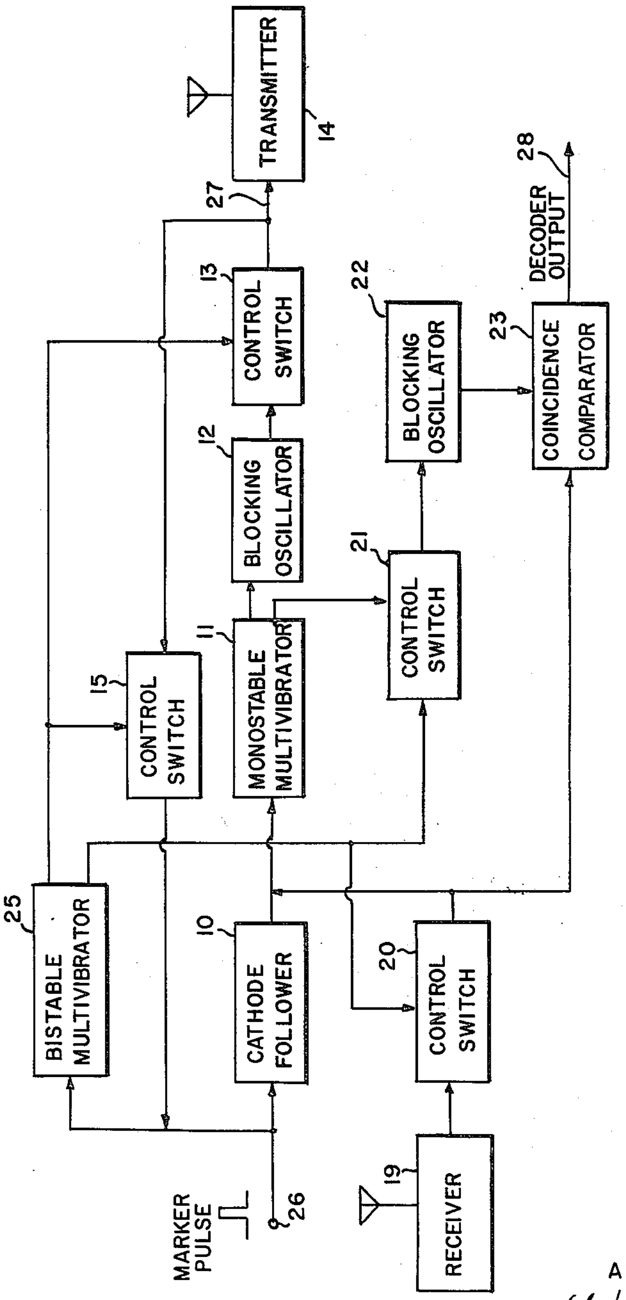
FIG. 1 shows three possible time space code signals for three radars.

In a shoran unit, the navigation is accomplished by receiving intelligence from two ground stations. The intelligence consists of the distance the aircraft is from the two ground stations. The ground stations function only to receive a radar signal and then to transmit it back to the aircraft. A shoran system enables 12 or so aircraft to use the same ground stations. Ths means that each aircraft must send out a signal which is different from the other aircraft signals which requires some type of coding, such as the space coding shown in FIG. 1. According to this system, variations in the time between pulses is used to vary the code.

Figure 2:
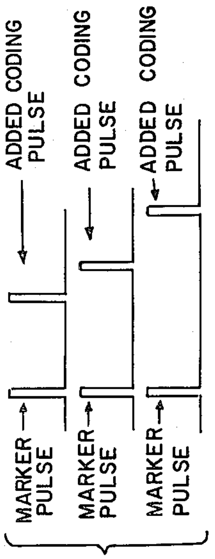
FIG. 2 is a block diagram of a coding and decoding system according to one embodiment of the invention.

Referring now to FIG. 2 of the drawing, the coding circuit consists of a cathode follower 10, a monostable multivibrator 11, a blocking oscillator 12 and switches 13 and 15. The decoding circuit consists of switches 20 and 21, the monostable multivibrator 11, blocking oscillator 22 and a coincidence circuit 23. As can be seen, the monostable multivibrator is common to both the coding and decoding circuits. A bistable multivibrator circuit 25 controls the operation of the coding and decoding circuits by closing control switches 13 and 15 for the coding operation and control switches 20 and 21 for the decoding operation.

Figure 3:
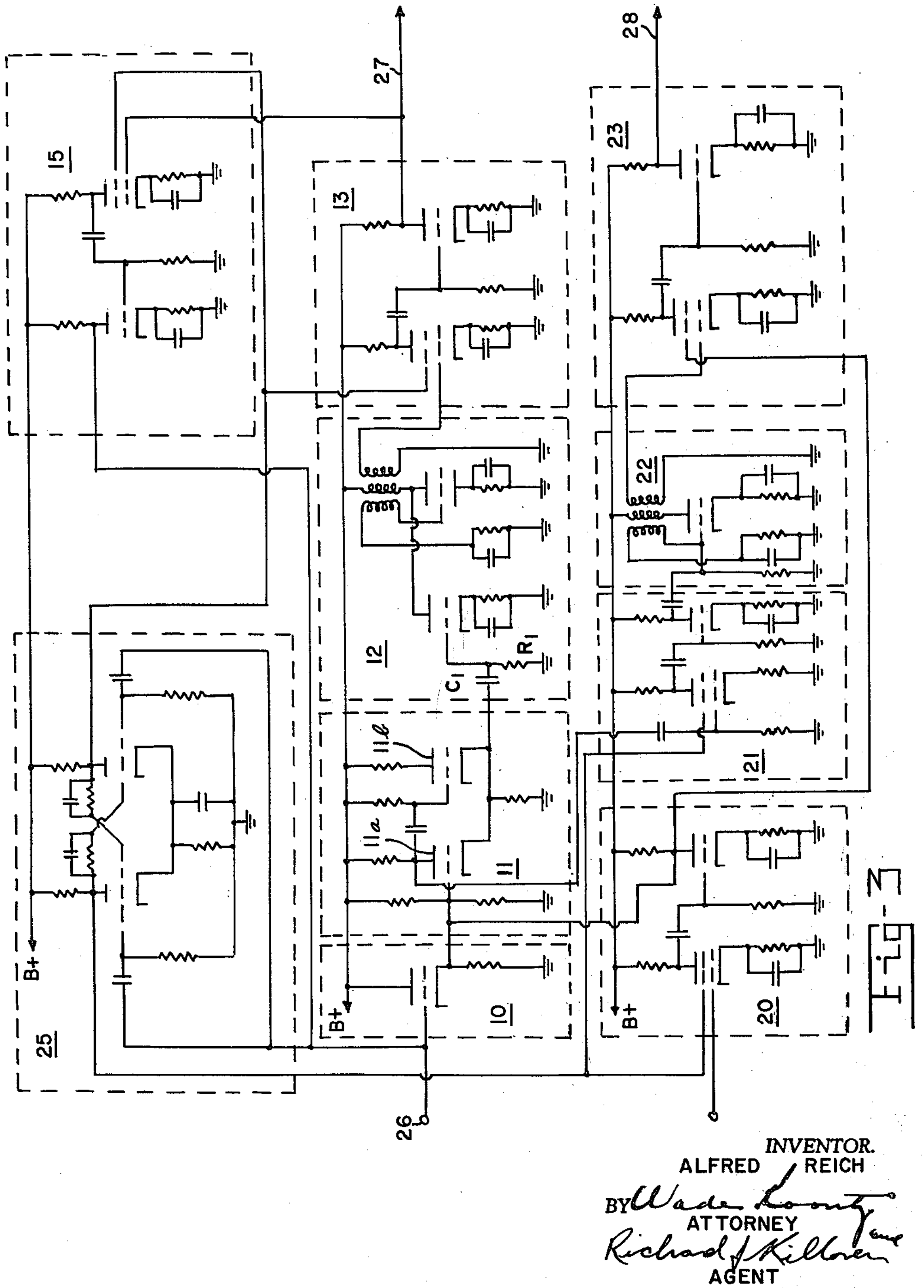
FIG. 3 is a circuit schematic for the device of FIG. 2.
Figure 4:
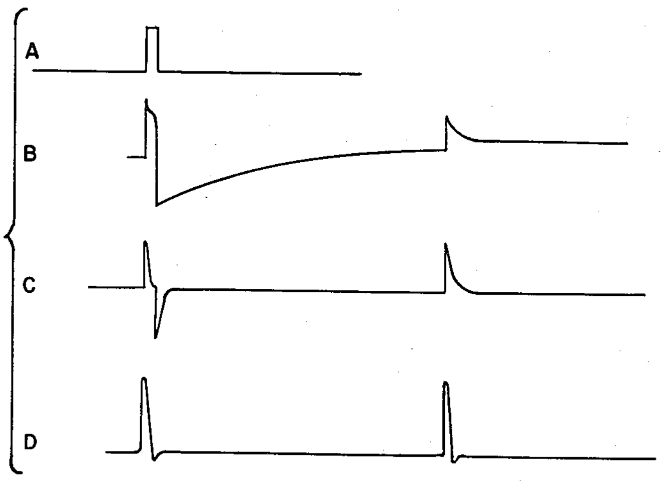
FIG. 4 shows the waveforms at various points in the circuit for the coding operation.

A marker pulse applied to terminal 26 will enter the bistable multivibrator circuit 25 and turn switches 13 and 15 on. This pulse also enters the cathode follower circuit 10. The output of cathode follower 10 shown in waveform A of FIG. 4 is applied to the monostable multivibrator 11. As shown in FIG. 3, the output taken off of the cathode circuit of the monostable multivibrator is differentiated in differentiating circuit including elements $C_1$ and $R_1$ and applied to the blocking oscillator 12. The cathode output is shown in waveform B of FIG. 4. The differentiated signal which is applied to the blocking oscillator is shown in waveform C of FIG. 4. The first positive going signal in the cathode output, which produces the first positive pulse in the output of the differentiating circuit, is caused by the cathode follower action of tube 11A in FIG. 3, which exists until the change of state of the multivibrator circuit takes place. The differentiated signal produces an output in the blocking oscillator such as shown in waveform D of FIG. 4. As can be seen from waveform D of FIG. 4, the original pulse and one delayed pulse is produced in the output of the blocking oscillator. The time spacing of these pulses represents the code signal and this time spacing can be set by selecting the circuit constants of the monostable multivibrator 11. The output of the blocking oscillator is fed to switch 13. When this switch is energized, the signal is passed to the transmitter 14 over line 27 and is also fed to switch 15. With switch 15 also in its conducting condition, the signal is applied to the bistable multivibrator circuit 25 which disengages switches 13 and 15 and engages switches 20 and 21. As can be seen, only the first pulse will be passed by switch 15 since this switch will be disengaged by the first pulse. The time taken for the first pulse to pass through switch 15 and for the operation of multivibrator 25 and switch 13 must be great enough to allow the second pulse in the output of blocking oscillator 12 to pass through switch 13. In some cases it may be necessary to include a delay means in the circuit between the output of switch 13 and the input to bistable multivibrator 25. For example, with a delay line included in the circuit between the control switch 13 and control switch 15 most of the delay to permit the second pulse to pass switch 13 can be located here thus requiring very little circuit delay between the output of switch 15 and the input to switches 13 and 15 from multivibrator 25. It can be seen that the delay could be such that both pulses could appear at different portions of this delay and that switches 13 and 15 could easily be made to operate before the second pulse passed the switch 15. After switching, the circuit is ready to receive the return signal from the ground station.

Figure 5:
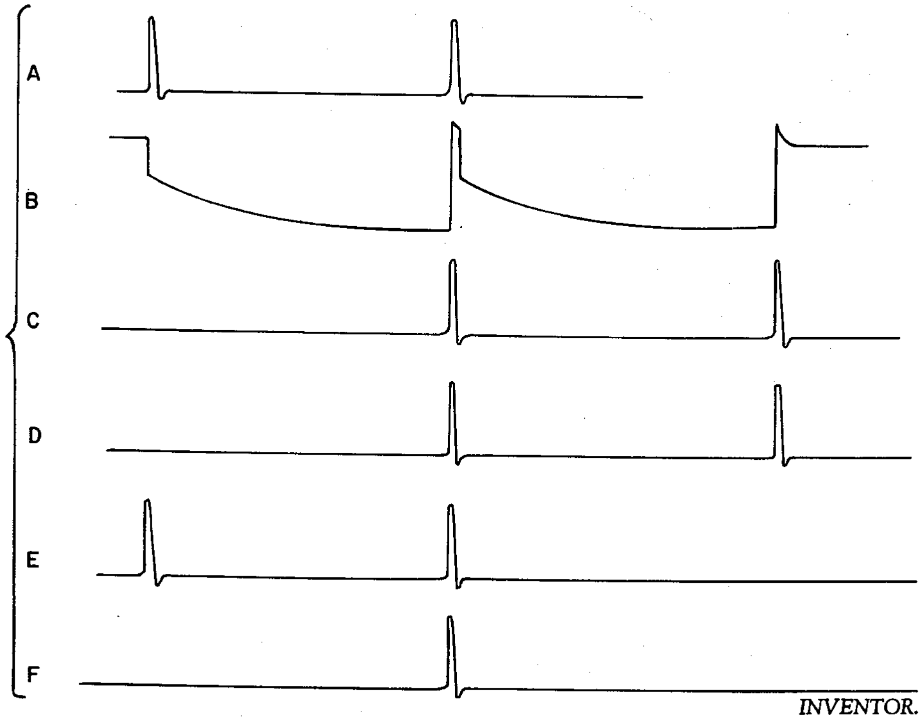
FIG. 5 shows the waveforms at various points in the circuit for the decoding operation.

The received signal is applied to switch 20 from receiver 19. Since this switch is now in its conducting position, the signal will be passed to the monostable multivibrator 11 and also to the coincidence comparator circuit 23. The received signal is shown in waveform A of FIG. 5. As shown in FIG. 3, a second output is taken off of the anode circuit of multivibrator 11A and is applied to the switch 21. This output is shown in waveform B of FIG. 5. Since switch 21 is also energized at this time, this signal will be passed to the blocking oscillator 22 and will produce an output in the blocking oscillator such as shown in waveform C of FIG. 5. This output is applied to the coincidence comparator circuit 23. Waveforms D and E of FIG. 5 show the waveforms applied to the coincidence comparator circuit. These signals then produce an output in the coincidence comparator circuit as shown in the waveform F of FIG. 5. The circuit diagram of FIG. 3 shows the circuit elements in substantially the same position as shown in the block diagram of FIG. 2. Each of the blocks in FIG. 3 is given a like reference numeral to those shown in FIG. 2.

There is thus provided a coding and decoding circuit which requires less equipment than prior art devices and wherein the coding operation automatically sets the decoding operation.

While one specific embodiment has been described in some detail, it is obvious that numerous changes may be made without departing from the general principles and scope of the invention.

I claim:

1. A radar system component, comprising; a coding circuit, a decoding circuit, a pulse spacing means common to said coding circuit and said decoding circuit, means for blocking the operation of said decoding circut during operation of said coding circuit and means responsive to the output of said coding circuit for switching said radar system component from coding operation to decoding operation and for blocking operation of said coding circuit during operation of said decoding circuit.

2. A coding and decoding circuit for radar, comprising; a coding circuit including a monostable multivibrator having a first and a second output circuit; an input circuit connected to said monostable multivibrator; a blocking oscillator; means for differentiating the first output of said multivibrator; means for applying the output of said differentiating circuit to said blocking oscillator; an output circuit connected to said blocking oscillator; a decoding circuit including a receiver, said monostable multivibrator, a second blocking oscillator and a coincidence comparator circuit; means for connecting the output of said receiver to said multivibrator and to said comparator circuit; means for connecting the second output of said multivibrator to said second blocking oscillator; means for connecting the output of said blocking oscillator to said comparator circuit; means for blocking the operation of said decoding circuit during operation of said coding circuit and means for blocking the operation of said coding circuit during the operation of said decoding circuit.

3. A coding and decoding circuit for radar, comprising; a coding circuit including a monostable multivibrator having a first and a second output circuit; an input circuit connected to said monostable multivibrator; a blocking oscillator; means for differentiating the first output of said multivibrator; means for applying the output of said differentiating circuit to said blocking oscillator; an output circuit connected to said blocking oscillator; a decoding circuit including a receiver, said monostable multivibrator, a second blocking oscillator and a coincidence comparator circuit; means for connecting the output of said receiver to said multivibrator and to said comparator circuit; means for connecting the second output of said multivibrator to said second blocking oscillator; means for connecting the output of said second blocking oscillator to said comparator circuit; a bistable multivibrator; means for applying a triggering pulse to said bistable multivibrator to switch said bistable multivibrator to its first condition; means responsive to said first condition for disabling said decoding circuit and for engaging said coding circuit; means responsive to an output from said coding circuit to switch said bistable multivibrator to its second condition and means responsive to said second condition for disabling said coding circuit and for engaging said decoding circuit.

4. A coding and decoding circuit for radar systems having a radar transmitter and a radar receiver, comprising; a coding circuit including a monostable multivibrator having a first and second output circuit; a differentiating circuit; a blocking oscillator; a first control switch connected to the output of said blocking oscillator; means for connecting the first output of said multivibrator to said blocking oscillator through said differentiating circuit; output means connected to said first control switch whereby the output of said coding circuit may be applied to the radar transmitter; a decoding circuit including a third control switch, said monostable multivibrator, a fourth control switch, a second blocking oscillator and a coincidence comparator circuit; means for operating said control switches to prevent said coding circuit and said decoding circuit from being in operation at the same time; a second control switch, connected between said first control switch and said switch operating means, and being operative at the same time as said first control switch; means for applying a signal from the radar receiver to said third control switch; means for applying the output of said third control switch to said monostable multivibrator and said coincidence comparator circuit; means for applying the second output of said multivibrator to said second blocking oscillator through said fourth control switch; means for connecting the output of said second blocking oscillator to said comparator circuit and an output circuit connected to said comparator circuit.

5. A coding and decoding circuit for radar systems having a radar transmitter and a radar receiver, comprising; a bistable multivibrator having two output circuits, a monostable multivibrator having two output circuits, means for applying a triggering pulse simultaneously to said bistable multivibrator and said monostable multivibrator, a first blocking oscillator, means for differentiating the first output of said monostable multivibrator, means for applying said differentiated signal to said blocking oscillator, a first and second control switch connected in series in the output circuit of said blocking oscillator, output means connected at a point between said control switches, means for applying the output of said second control switch to said bistable multivibrator, a third control switch, means for applying a signal from the receiver to said third control switch, a coincidence comparator circuit, means for applying the output of said third control switch to the input of said monostable multivibrator and a first input of said coincidence comparator circuit, a fourth control switch, means for applying the second output of said monostable multivibrator to said fourth control switch, means for applying the first output signal from said bistable multivibrator to said first and second control switches, means for applying the second output of said bistable multivibrator to said third and fourth control switches, a second blocking oscillator, means for applying the output of said fourth control switch to said second blocking oscillator, means for applying the output of said second blocking oscillator to said coincidence comparator circuit.

No references cited.